United States Patent
Glover

(10) Patent No.: US 6,619,752 B1
(45) Date of Patent: Sep. 16, 2003

(54) EXTENSIBLE TETHER FOR JUVENILE VEHICLE SEAT

(75) Inventor: Richad Glover, Greenwood, IN (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 09/989,064

(22) Filed: Nov. 21, 2001

(51) Int. Cl.[7] .............................................. B60R 22/28
(52) U.S. Cl. ........................ 297/470; 297/468; 297/471; 280/805; 280/801.1
(58) Field of Search ................................ 297/471, 470, 297/468, 472; 119/797, 798, 771; 280/805, 801.1

(56) References Cited

U.S. PATENT DOCUMENTS

| | | |
|---|---|---|
| 3,741,494 A | 6/1973 | Fiala |
| 3,848,887 A | 11/1974 | Fox |
| 3,862,673 A | 1/1975 | Benson |
| 3,890,002 A | 6/1975 | Warmskessel |
| 3,897,106 A | 7/1975 | Takada |
| 3,938,627 A | 2/1976 | Nagazumi |
| 4,099,778 A | 7/1978 | Lehr |
| 4,119,344 A | 10/1978 | Kondo |
| 4,138,157 A * | 2/1979 | Pickett et al. ............... 297/472 |
| 4,199,190 A | 4/1980 | Lindblad |
| 4,304,320 A | 12/1981 | Hull |
| 4,358,136 A | 11/1982 | Tsuge et al. |
| 4,385,775 A | 5/1983 | Shimogawa et al. |
| 4,515,254 A | 5/1985 | Markov et al. |
| 4,569,190 A | 2/1986 | Gilmore |
| 4,588,208 A | 5/1986 | Yoshitsugu |
| 4,645,231 A | 2/1987 | Takada |
| 4,662,487 A | 5/1987 | Koch |
| 4,674,801 A | 6/1987 | DiPaola et al. |
| 4,832,410 A | 5/1989 | Bougher |
| 4,854,608 A | 8/1989 | Barral |
| 4,966,393 A | 10/1990 | Tokugawa |
| 5,050,906 A | 9/1991 | Kneip |
| 5,186,520 A | 2/1993 | Whitaker et al. |
| 5,333,935 A | 8/1994 | DiPaola |
| 5,383,713 A | 1/1995 | Kamiyama et al. |
| 5,431,447 A | 7/1995 | Bauer |
| 5,511,856 A | 4/1996 | Merrick et al. |
| 5,544,918 A | 8/1996 | Fleming et al. |
| 5,609,365 A | 3/1997 | Holka |
| 5,658,012 A | 8/1997 | Villarreal et al. |
| 5,873,328 A * | 2/1999 | Campbell .................... 119/798 |
| 5,913,538 A | 6/1999 | Herpich |
| 5,915,336 A * | 6/1999 | Watson ........................ 119/797 |
| 5,971,489 A | 10/1999 | Smithson et al. |
| 6,116,696 A | 9/2000 | Widman et al. |
| 6,135,563 A | 10/2000 | Yoshioka |
| 6,155,638 A | 12/2000 | Bapst |
| 6,260,926 B1 * | 7/2001 | Meraw ........................ 297/468 |
| 6,273,505 B1 | 8/2001 | Carnahan |
| 6,276,714 B1 | 8/2001 | Yoshioka |
| 6,467,437 B2 * | 10/2002 | Donovan et al. ............ 119/798 |

FOREIGN PATENT DOCUMENTS

DE 2419196 A * 11/1975 .......... G03G/13/01

OTHER PUBLICATIONS

Translation of Willrath et al. (DE 2,419,193).*

* cited by examiner

*Primary Examiner*—Peter R. Brown
*Assistant Examiner*—Stephen D'Adamo
(74) *Attorney, Agent, or Firm*—Barnes & Thornburg

(57) ABSTRACT

An extensible tether is provided for tethering a juvenile vehicle seat to a tether anchor in a vehicle. The extensible tether includes a tether strap and a compliant member trapped in a space formed in the tether strap and configured to deform when a longitudinal tugging force is applied to the tether strap to lengthen the extensible tether during sudden vehicle stoppage or slowdown.

24 Claims, 1 Drawing Sheet

EXTENSIBLE TETHER FOR JUVENILE VEHICLE SEAT

BACKGROUND AND SUMMARY

The present disclosure relates to tethers, and in particular, to juvenile vehicle seat tethers. More particularly, the present disclosure relates to a tether adapted to be coupled at one end to a juvenile vehicle seat and at another end to a tether anchor mounted in a vehicle.

According to the present disclosure, a juvenile vehicle seat tether includes a tether strap and a compliant member retained in a space provided between opposing first and second strap portions included in the tether strap. In a normal "at-rest" condition, either or both of the first and second strap portions are positioned to assume curved shapes around the compliant member. During sudden vehicle stoppage or slowdown, the first and second strap portions "straighten" somewhat as they move toward one another to increase the effective length of the tether. The extensible tether functions to help stabilize the juvenile vehicle seat on a seat in a vehicle.

The compliant member is configured to deform when "squeezed" under loads applied by the opposing first and second strap portions included in the tether strap as a longitudinal tugging force is applied to the tether strap during sudden vehicle stoppage or slowdown. Such deformation allows the first and second strap portions to move toward one another so as to straighten somewhat the otherwise curved first and second strap portions and thereby increase the effective length of the extensible juvenile vehicle seat tether by a predictable amount during sudden vehicle stoppage or slowdown.

In illustrative embodiments, the compliant member is a spool made of an elastic material that deforms when squeezed between the opposing first and second strap portions whenever the juvenile vehicle seat moves away from the tether anchor during, for example, sudden vehicle stoppage or slowdown. The tether strap includes, in series, first, second, third, and fourth segments. The first segment is adapted to be coupled to the juvenile vehicle seat and the third segment is coupled to a tether hook, which hook is adapted to be coupled to a tether anchor mounted in a vehicle. The second segment defines the "first strap portion" and the fourth segment defines the "second strap portion." The second and fourth segments are coupled at opposite ends thereof to one another to provide the space receiving the compliant member therebetween.

Additional features of the present disclosure will become apparent to those skilled in the at upon consideration of the following detailed description of an illustrative embodiment exemplifying the best mode of carrying out the disclosure as presently perceived.

BRIEF DESCRIPTION OF THE DRAWINGS

The detailed description particularly refers to the accompanying figures in which.

DETAILED DESCRIPTION OF THE DRAWINGS

Figure 1:
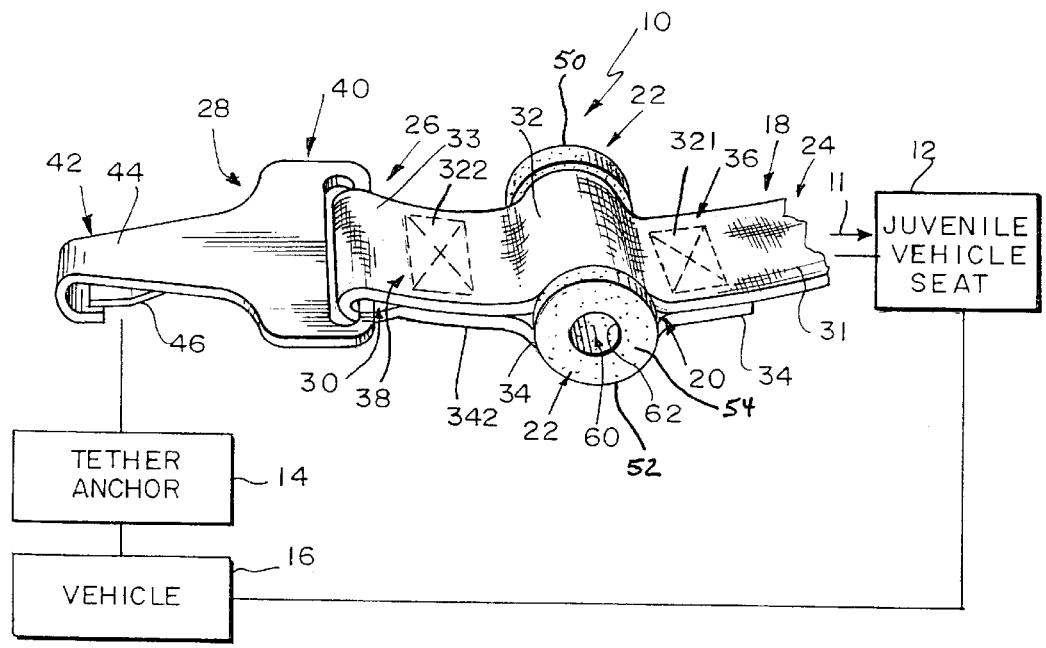
FIG. 1 is a perspective view of an extensible tether adapted to be coupled to a vehicle and to a juvenile vehicle seat and showing a compliant member retained in a space ed between two opposing portions of a tether strap.

An extensible tether 10 is adapted to anchor a juvenile vehicle seat 12 to a tether anchor 14 mounted in a vehicle 16 to help stabilize juvenile vehicle seat 12 in place on a seat (not shown) included in vehicle 16 as shown diagrammatically in FIG. 1. Tether 10 comprises a tether strap 18 formed to include a space 20 and a compliant member 22 located in space 20. One end 24 of tether strap 18 is adapted to be coupled using any suitable means to juvenile vehicle seat 12 and another end 26 of tether strap 18 is adapted to be coupled using any suitable means (e.g., tether hook 28) to tether anchor 14.

Compliant member 22 is made of a deformable elastic material. As used herein, "compliant" means the quality or state of yielding to external forces within an elastic limit.

Compliant member 22 and two strap portions 32, 34 that are included in tether strap 18 and spread apart from one another to retain compliant member 22 in the space 20 formed therebetween cooperate to provide means for extending the effective length of tether 10 between tether anchor 14 and juvenile vehicle seat 12 by a predictable amount during movement of juvenile vehicle seat 12 away from, for example, tether anchor 14 to apply a longitudinal tugging force 11 to tether strap 18. Such movement may occur if vehicle 16 stops or slows suddenly. During such an event, first and second strap portions 32, 34 will move toward one another and against compliant member 22 to cause compliant member 22 to deform within its elastic limit and such movement will cause the normally "curved" first and second strap portions 32, 34 to "straighten" somewhat and , in effect, increase the effective length of tether 10.

In an illustrative embodiment, tether strap 18 includes, in series, a first segment 31, a second segment 32, a third segment 33, and a fourth segment 34. The segments 31, 32, 33, 34 are arranged as shown in FIGS. 1 and 2 so that (1) space 20 is provided by coupling a first end 321 of second segment 32 to a first end 341 of fourth segment 34 at a first site 36 and coupling a second end 322 of second segment 32 to a second end 342 of fourth segment 34 at a second site 38 and (2) another space 30 is provided by looping third segment 33.

At each of sites 36, 38, a thread is sewn in an "X-tacked" pattern as shown, for example, in FIG. 1 to couple the ends of second and fourth segments 32, 34 to one another. It is within the scope of this disclosure to use any suitable means for connecting strap segments together to provide space 20 between such strap segments.

Figure 2:
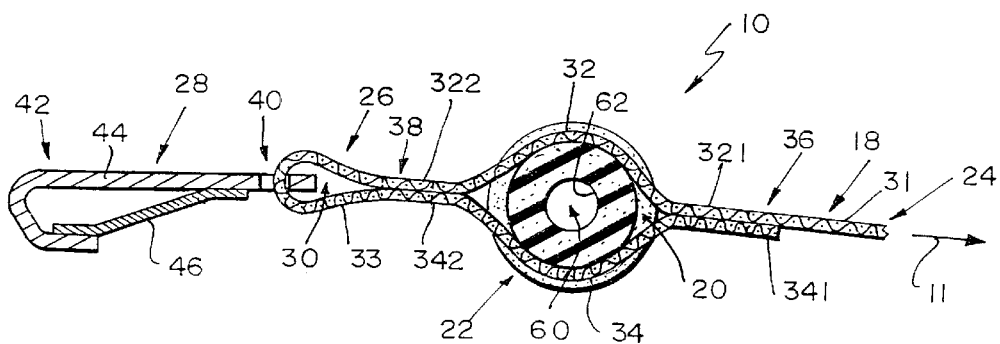
FIG. 2 is a longitudinal sectional view of the tether of FIG. 1.

In an illustrative embodiment, tether hook 28 comprises a retainer 40 coupled to third segment 33 of tether strap 18 and a clip 42 (or other suitable tether anchor connector) coupled to retainer 40 as shown, for example, in FIGS. 1 and 2. Clip 42 includes a hooked portion 44 and a movable clasp 46 made of spring material.

Compliant member 22 includes first and second ends 50, 52 and a body 54 extending between first and second ends 50, 52. Body 54 is located in space 20 to engage the first strap portion provided by second segment 32 of tether strap 18 and to engage the opposing second strap portion provided by fourth segment 34 of tether strap 18.

In an illustrative embodiment, the body 54 is cylinder-shaped and each of the first and second ends 50, 52 is round and has a diameter that is greater than the diameter of the cylinder-shaped body 54. Thus, body 54 has a curved exterior surface and the outer periphery of each end 50, 52 cooperate with that curved exterior surface to form an exterior channel and each of first and second strap portions 32, 34 extend through a portion of that exterior channel as shown, for example, in FIG. 1 to retain compliant member 22 in the space 20 provided between the first and second strap portions 32, 34.

In an illustrative embodiment, compliant member 22 has an interior channel 60 extending therethrough and having openings in each of the first and second ends 50, 52. A cylindrical interior wall 62 is provided in compliant member 22 to define interior channel 60. Forming compliant member 22 to include larger diameter ends 50, 52 and interior channel 60 causes compliant member 22 to have a spool shape as suggested in FIG. 1.

During movement of juvenile vehicle seat 12 away from tether anchor 14 of the type that might occur during any sudden stoppage or slowdown of vehicle 16, a longitudinal tugging force 11 will be applied to first segment 31 of tether strap 18 as suggested in FIG. 1 to cause, for example, first and third segments 31, 33 to move away from one another. There is some "slack" in tether strap 18 because compliant member 22 is located in space 20 to spread first and strap portions 32, 34 apart so as to assume somewhat curved shapes.

Once longitudinal tugging force 11 is applied to first segment 31, the otherwise "curved" first and second strap portions 32, 34 will tend to "straighten" as they move toward one another and deform compliant member 22 retained therebetween. Such straightening functions to increase the effective length of extensible tether 10 by a predictable amount in response to sudden vehicle stoppage or slowdown. Such an increase in effective length tends to minimize acceleration of juvenile vehicle seat 12 during such a sudden vehicle stoppage or slowdown.

What is claimed is:

1. An extensible tether for tethering a juvenile vehicle seat to a vehicle, the tether comprising
    a tether strap including a first strap portion and a second strap portion fixedly coupled to at least one overlapping part of the first strap portion to provide a space therebetween and
    a compliant member retained in the space and configured to deform under compression loads applied by the first and second strap portions as the first and second strap portions move toward one another and against the compliant member located therebetween in response to a longitudinal tugging force applied to the tether strap.

2. The tether of claim 1, wherein the compliant member has a curved shape and each of the first and second strap portions is arranged to engage a curved exterior surface of the compliant member.

3. The tether of claim 2, wherein the curved exterior surface is cylinder-shaped.

4. The tether of claim 3, wherein the compliant member is tubular.

5. The tether of claim 2, wherein the compliant member is formed to include a first end and a second end positioned to lie in spaced-apart relation to the first end and to locate the curved exterior surface between the first and second ends and the compliant member is also formed to include an interior channel extending therethrough and having an opening in each of the first and second ends.

6. The tether of claim 5, wherein the compliant member includes a cylindrical interior wall arranged to define the interior channel extending therethrough.

7. The tether of claim 5, wherein the curved exterior surface and the first and second ends cooperate to form an exterior channel and each of the first and second strap portions extend through a portion of the exterior channel to retain the compliant member in the space provided between the first and second strap portions.

8. The tether of claim 1, wherein the tether strap includes, in series, first, second, third, and fourth segments, the first strap portion is defined by the second segment, and the second strap portion is defined by the fourth segment.

9. The tether of claim 8, further comprising at ether hook coupled to the third segment and adapted to be coupled to a tether anchor mounted in a vehicle.

10. The tether of claim 8, wherein first ends of each of the first and second strap portions are coupled to one another and opposite second ends of each of the first and second strap portions are coupled to one another to form the space between the first and second strap portions.

11. The tether of claim 10, wherein the third segment is formed to include a loop providing a loop opening and further comprising a tether hook including a retainer extending through the loop opening formed in the third segment and a clip coupled to the retainer and adapted to be coupled to a tether anchor mounted in a vehicle.

12. The tether of claim 10, wherein a first thread is sewn in an X-tacked pattern to couple the first ends to one another and a second thread is sewn in an X-tacked pattern to couple the second ends to one another.

13. The tether of claim 9, wherein the compliant member is a spool having a curved exterior surface arranged to engage the first and second strap portions.

14. The tether of claim 1, wherein the compliant member is a spool having first and second ends and a cylindrical body extending between the first and second ends.

15. The tether of claim 14, wherein the cylindrical body has a diameter and each of the first and second ends has a diameter greater than the diameter of the cylindrical body, and each of the first and second strap portions is arranged to engage the cylindrical body and lie between the first and second ends to retain the compliant member in the space provided between the first and second strap portions.

16. An extensible tether for tethering a juvenile vehicle seat to a vehicle, the tether comprising
    a tether hook adapted to be coupled to a tether anchor mounted in a vehicle,
    a tether strap including a first strap portion, a second strap portion fixedly coupled to at least one overlapping part of the first strap portion to provide a space therebetween, and a third strap portion coupled to the tether hook and to each of the first and second strap portions, and
    a compliant member retained in the space and configured to deform under compression loads applied by the first and second strap portions as the first and second strap portions move toward one another and against the compliant member located therebetween in response to a longitudinal tugging force applied to the tether strap.

17. The tether of claim 16, wherein the compliant member is a spool having a curved exterior surface arranged to engage the first and second strap portions.

18. The tether of claim 16, wherein the tether strap includes, in series, first, second, third, and fourth segments, the first strap portion is defined by the second segment, the second strap portion is defined by the fourth segment, and the third strap portion is defined by the third segment.

19. The tether of claim 18, wherein the third segment is formed to include a loop opening and the tether hook includes a retainer extending through the loop formed in the third segment and a clip coupled to the retainer and adapted to be coupled to a tether anchor mounted in a vehicle.

20. The tether of claim 18, wherein the first segment is adapted to be coupled to a juvenile vehicle seat and a distal end of the fourth segment is coupled to the second segment at a junction between the first and second segments.

21. An extensible tether for tethering a juvenile vehicle seat to a vehicle, the tether comprising a tether strap including, in series, first, second, third, and fourth segments, the first segment being adapted to be coupled to a juvenile vehicle seat, and the second and fourth segments being coupled to one another to provide a space therebetween, a tether hook coupled to the third segment and adapted to be coupled to a tether anchor mounted in a vehicle, and a compliant spool retained in the space provided between the second and fourth segments and configured to deform radially under loads applied by the second and fourth segments as the second and fourth segments move toward one another in response to movement of the first and third segments away from one another.

22. The tether of claim 16, wherein the third strap portion is between the first and second strap portions.

23. An extensible tether for tethering a juvenile vehicle seat to a vehicle, the tether comprising a tether strap including a first strap portion and a second strap portion forming a closed loop to provide a space therebetween and a compliant member retained in the space and configured to deform under compression loads applied by the first and second strap portions as the first and second strap portions move toward one another and against the compliant member located therebetween in response to a longitudinal tugging force applied to the tether strap.

24. An extensible tether for tethering a juvenile vehicle seat to a vehicle, the tether comprising a tether hook adapted to be coupled to a tether anchor mounted in a vehicle, a tether strap including a first strap portion and a second strap portion forming a closed loop to provide a space therebetween, and a third strap portion coupled to the tether hook and to each of the first and second strap portions, and a compliant member retained in the space and configured to deform under compression loads applied by the first and second strap portions as the first and second strap portions move toward one another and against the compliant member located therebetween in response to a longitudinal tugging force applied to the tether strap.

* * * * *